United States Patent
Boehler et al.

(10) Patent No.: US 11,861,038 B2
(45) Date of Patent: Jan. 2, 2024

(54) SECURE MULTIPARTY DIFFERENTIALLY PRIVATE MEDIAN COMPUTATION

(71) Applicant: SAP SE, Walldorf (DE)

(72) Inventors: Jonas Boehler, Karlsruhe (DE); Florian Kerschbaum, Waterloo (CA)

(73) Assignee: SAP SE, Walldorf (DE)

( * ) Notice: Subject to any disclaimer, the term of this patent is extended or adjusted under 35 U.S.C. 154(b) by 422 days.

(21) Appl. No.: 16/699,997

(22) Filed: Dec. 2, 2019

(65) Prior Publication Data

US 2021/0165906 A1 Jun. 3, 2021

(51) Int. Cl.
*G06F 21/00* (2013.01)
*G06F 21/62* (2013.01)
*G06F 7/08* (2006.01)

(52) U.S. Cl.
CPC ............ *G06F 21/6245* (2013.01); *G06F 7/08* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,590,589 B2 * | 9/2009 | Hoffberg | ................ | G06Q 40/06 705/37 |
| 8,600,830 B2 * | 12/2013 | Hoffberg | ................ | G06Q 30/08 705/14.71 |
| 9,298,878 B2 * | 3/2016 | Guirguis | ............. | G06F 21/6209 |
| 9,311,670 B2 * | 4/2016 | Hoffberg | ................ | H04W 4/029 |
| 9,818,136 B1 * | 11/2017 | Hoffberg | ................. | G07F 17/32 |
| 10,146,958 B2 * | 12/2018 | Wang | ........................ | H04L 9/00 |
| 10,163,137 B2 * | 12/2018 | Hoffberg | ................ | G07F 17/323 |
| 10,489,605 B2 * | 11/2019 | Nerurkar | ................ | G06F 17/16 |
| 10,791,063 B1 * | 9/2020 | Florissi | ................. | H04L 47/783 |
| 10,860,622 B1 * | 12/2020 | Florissi | .................. | G06F 16/22 |
| 10,860,732 B2 * | 12/2020 | Guirguis | ............ | G06F 21/6209 |
| 11,238,167 B2 * | 2/2022 | Boehler | ............... | H04L 9/0894 |
| 2006/0167784 A1 * | 7/2006 | Hoffberg | ............... | H04W 4/029 705/37 |
| 2007/0036353 A1 * | 2/2007 | Reznik | ............... | H04L 63/0428 380/30 |
| 2007/0087756 A1 * | 4/2007 | Hoffberg | .......... | G06Q 10/06375 455/450 |
| 2008/0177994 A1 * | 7/2008 | Mayer | ..................... | G06F 16/00 709/224 |

(Continued)

OTHER PUBLICATIONS

"Learning with Privacy at Scale", Apple's Differential Privacy Team, [Online]. Retrieved from the Internet: <URL: https://machinelearning.apple.com/research/learning-with-privacy-at-scale>, (Dec. 2017), 8 pgs.

(Continued)

*Primary Examiner* — Farhan M Syed
(74) *Attorney, Agent, or Firm* — SCHWEGMAN LUNDBERG & WOESSNER, P.A.

(57) ABSTRACT

In an example embodiment, a differentially private function is computed via secure computation. Secure computation allows multiple parties to compute a function without learning details about the data. The differentially private function is performed via probability distribution, which then permits computation of a result that is likely to be very close to the actual value without being so exact that it can be used to deduce the underlying data itself.

20 Claims, 7 Drawing Sheets

(56) References Cited

U.S. PATENT DOCUMENTS

| | | | |
|---|---|---|---|
| 2010/0235285 A1* | 9/2010 | Hoffberg | G06Q 50/188 705/37 |
| 2010/0317420 A1* | 12/2010 | Hoffberg | G06Q 30/0282 463/1 |
| 2011/0004513 A1* | 1/2011 | Hoffberg | G06Q 30/0207 705/14.1 |
| 2011/0270748 A1* | 11/2011 | Graham, III | G06Q 20/3829 705/40 |
| 2011/0270760 A1* | 11/2011 | Graham, III | G06Q 40/00 705/51 |
| 2011/0270761 A1* | 11/2011 | Graham, III | G06Q 40/00 705/51 |
| 2011/0270763 A1* | 11/2011 | Graham, III | G06Q 20/3829 705/71 |
| 2011/0276493 A1* | 11/2011 | Graham, III | G06Q 20/3829 705/53 |
| 2012/0030165 A1* | 2/2012 | Guirguis | G06F 21/6254 707/E17.007 |
| 2014/0081793 A1* | 3/2014 | Hoffberg | G06Q 30/08 705/26.3 |
| 2014/0281572 A1* | 9/2014 | Wang | G06F 21/6254 713/189 |
| 2016/0085982 A1* | 3/2016 | Guirguis | G06F 16/283 726/26 |
| 2017/0243028 A1* | 8/2017 | LaFever | G06F 21/6254 |
| 2018/0239925 A1* | 8/2018 | Nerurkar | G06F 17/16 |
| 2018/0307859 A1* | 10/2018 | LaFever | H04L 63/20 |
| 2019/0332807 A1* | 10/2019 | LaFever | G06F 21/6254 |
| 2021/0089669 A1* | 3/2021 | Guirguis | G16H 10/60 |

OTHER PUBLICATIONS

"WWDC16", Apple Inc., [Online]. Retrieved from the Internet: <URL: https://developer.apple.com/videos/play/wwdc2016/709/>, (Accessed Aug. 16, 22), 4 pgs.

Abowd, John, "The U.S. Census Bureau Adopts Differential Privacy", KDD '18 Proceedings of the 24th ACM SIGKDD International Conference on Knowledge Discovery & Data Mining, (2018), 43 pgs.

Aggarwal, Gagan, et al., "Secure Computation of the kth-Ranked Element", Eurocrypt 2004, LNCS 3027, (2004), 40-55.

Alhadidi, Dima, et al., "Secure distributed framework for achieving e-differential privacy", PETS 2012, LNCS 7384, (2012), 120-139.

Aly, Abdelrahaman, et al., "Benchmarking Privacy Preserving Scientifc Operations", ACNS, (2019), 20 pgs.

Bassily, Raef, et al., "Private Empirical Risk Minimization: Efficient Algorithms and Tight Error Bounds", IEEE Annual Symposium on Foundations of Computer Science, (2014), 464-473.

Beaver, Donald, "Efficient multiparty protocols using circuit randomization", CRYPTO, (1991), 420-432.

Bittau, Andrea, et al., "Prochlo: Strong privacy for analytics in the crowd", Proceedings of the Symposium on Operating Systems Principles, (2017), 441-459.

Blocki, Jeremiah, et al., "Differentially Private Password Frequency Lists", NDSS, (2016), 15 pgs.

Cheu, Albert, et al., "Distributed Differential Privacy via Shuffling", arXiv:1808.01394v3, (2019), 42 pgs.

Damgard, Ivan, et al., "Unconditionally secure constant-rounds multi-party computation for equality, comparison, bits and exponentiation", TCC, LNCS 3876, (2006), 285-304.

Demillo, Richard, et al., "Even data bases that lie can be compromised", IEEE Transactions on Software Engineering, (1978), 3 pgs.

Ding, Bolin, et al., "Collecting Telemetry Data Privately", NIPS, (2017), 10 pgs.

Dwork, C, et al., "Calibrating noise to sensitivity in private data analysis", in Proceedings of the Third Conference on Theory of Cryptography, ser. TCC'06. Berlin, Heidelberg: Springer-Verlag, <http://dx.doi.org/10.1007/1168187814>, (2006), 265-284.

Dwork, Cynthia, "Differential Privacy", ICALP. Lecture Notes in Computer Science, vol. 4052, (2006), 1-12.

Dwork, Cynthia, et al., "Differential Privacy and Robust Statistics", STOC, (2009), 10 pgs.

Dwork, Cynthia, et al., "The Algorithmic Foundations of Differential Privacy", Foundations and Trends in Theoretical Computer Science, vol. 9, Nos. 3-4, 211-407, (2014), 281 pgs.

Eigner, Fabienne, et al., "Differentially private data aggregation with optimal utility", ASAC, (2014), 30 pgs.

Erlingsson, U, et al., "RAPPOR: Randomized Aggregatable Privacy-Preserving Ordinal Response", Proceedings of the ACM SIGSAC conference on computer and communications security, (2014), 1054-1067.

Hsu, Justin, et al., "Distributed private heavy hitters", arXiv:1202.4910v1, (2012), 19 pgs.

Kamm, Liina, "Privacy-preserving statistical analysis using(thesis)", University of Tartu, (2015), 100 pgs.

Kasiviswanathan, Shiva, et al., "What can we learn privatley?", SIAM J. Comput., vol. 40, No. 3, (2011), 793-826.

McGregor, Andrew, et al., "The Limits of Two-Party Differential Privacy", IEEE Symposium on Foundations of Computer Science, (2010), 81-90.

McSherry, Frank, et al., "Mechanism Design via Differential Privacy.", Annual IEEE Symposium on Foundations of Computer Science, (2007), 94-103

McSherry, Frank, "Privacy Integrated Queries: An Extensible Platform for Privacy-Preserving Data Analysis", Proceedings of the 2009 ACM SIGMOD International Conference on Manadement of data, (2010), 89-97.

Nissim, Kobbi, et al., "Smooth Sensitivity and Sampling in Private Data Analysis", Proceedings of the annual ACM symposium on Theory of Computing, (2011), 34 pgs Pettai, Martin, et al., "Combining Differential Privacy and Secure Multiparty Computation", Proceedings of the Annual Computer Security Applications Conference, (2015), 21 pgs Smith, Adam, et al., "Is interaction necessary for distributed private learning?", EEE Symposium on Security and Privacy, (2017), 58-77.

* cited by examiner

SECURE MULTIPARTY DIFFERENTIALLY PRIVATE MEDIAN COMPUTATION

TECHNICAL FIELD

This document generally relates to systems and methods for use data storage and analysis. More specifically, this document relates to secure multiparty differentially private function computation.

BACKGROUND

With the rise of cloud computing and distributed architectures, it is quite common for related data to be stored across multiple devices and/or systems. Indeed, in some circumstances, related data can actually be held and managed by multiple parties, with some parties holding and managing certain portions of the data and at least one other party holding and managing other portions of the data. Thus, no single party has access to all of the data.

Companies often collect data such as telemetry, usage statistics, and frequent settings from users. It can be useful for these companies to evaluate the data using various functions, such as rank-based statistical functions. Median, for example, is an important robust statistical method used in enterprise benchmarking, such as by companies comparing typical employee salaries, insurance companies evaluating median life expectancy to adjust insurance premiums, and banks comparing credit scores of their customers. When the data itself, however, is maintained and held by multiple parties, there are various legal and privacy concerns with sharing this data with at least one other party. For example, in the case of medical data, federal regulations such as Health Insurance Portability and Accountability (HIPAA) regulations may prevent the sharing of individual medical data without explicit permission from the patient. Indeed, in certain circumstances, exact computations of rank-based statistical functions may be used maliciously or accidentally to reveal data about a specific user. For example, if one queried a system for a total number of users having been diagnosed as HIV+, and the result was given as 100, and then one queried a system for a total number of users not named X having been diagnosed as HIV+, and the result was given as 99, then one could deduce that X has been diagnosed as HIV+, despite no specific data regarding X being specifically requested or revealed.

A technical problem is therefore encountered in that it is difficult to protect privacy of users while still gaining insights using functions performed on the underlying data, without sharing the data across multiple parties and without permitting individual data to be deduced.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

In an example embodiment, a differentially private function is computed via secure computation. Secure computation allows multiple parties to compute a function without learning details about the data. The differentially private function defines a probability distribution, which then permits computation of a result that is likely to be very close to the actual value without being so exact that it can be used to deduce the underlying data itself.

Figure 1:
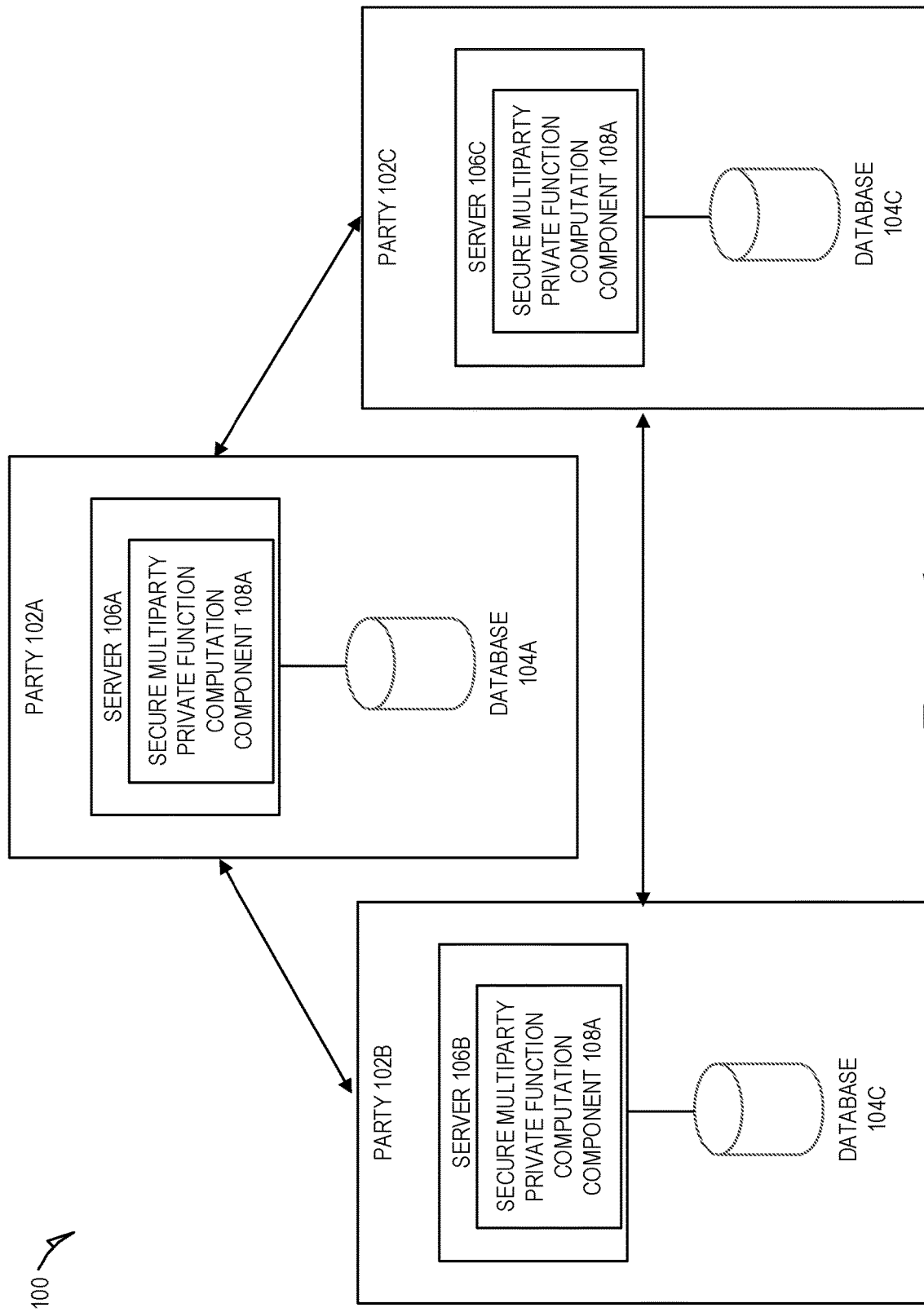
FIG. 1 is a block diagram illustrating a system for differentially private function computation in accordance with an example embodiment.

FIG. 1 is a block diagram illustrating a system 100 for differentially private function computation in accordance with an example embodiment. System 100 may include, for example, three parties 102A, 102B, 102C, although more parties are possible. Each party may maintain or otherwise control its own database 104A, 104B, 104C. Each party may also maintain or otherwise control its own server 106A, 106B, 106C. Each server 106A, 106B, 106C may act to obtain local queries from users and query their own corresponding databases 104A, 104B, 104C for results. In cases where the queries involve functions that require the analysis of data not stored in their own corresponding databases 104A, 104B, 104C, a secure multiparty private function computation component 108A, 108B, 108C located on each server 106A, 106B, 106C may be utilized to evaluate the corresponding function(s) based on information stored on other of the databases 104A, 104B, 104C. This may be accomplished via multi-party communication among the various secure multiparty private function computation components 108A, 108B, 108C, as will be described in more detail below.

In an example embodiment, the secure multiparty private function computation component 108A, 108B 108C may be in the form of software code that is made and distributed to the parties 102A, 102B, 102C by a third-party software developer. In some example embodiments, this software code may be included with the distribution of another product, such as a database server application or a workbench component.

As described briefly above, one technical problem that is encountered is how to protect the privacy of user's data while still gaining insights from this data, when the data is stored by multiple parties. In an example embodiment, both differential privacy and secure computation are used to accomplish this goal.

It should be noted that while the techniques described in this disclosure can be applied to any differentially private functions performed on a data set, one example of such a function is the median function. For ease of discussion, the present disclosure may refer specifically to the median function when describing some of all of the functionality. This shall not, however, be taken to mean that the score of the present disclosure is limited to median functions.

Differential privacy is a privacy notion used when statistical properties of a dataset can be learned but information about any individual in the data set needs to be protected. Specifically, databases D and D' are called neighbors, and are neighboring when database D can be obtained from D' by adding or removing one element. Informally a differentially private algorithm limits the impact that the presence or absence of any individual's data in the input database can have on the distribution of outputs. Specifically, in differential privacy:

DEFINITION 1 (DIFFERENTIAL PRIVACY). A mechanism M satisfies $\in$-differential privacy, where $\in \geq 0$, if for all neighboring databases D and D', and all sets $S \subseteq Range(M)$ $$Pr[M(D) \in S] \leq \exp(\in) \cdot Pr[M(D') \in S],$$

where Range(M) denotes the set of all possible outputs of mechanism M.

One way to accomplish differential privacy is to use what is called the Laplace mechanism, which acts to add Laplace distributed noise to a function evaluated on the data. This has the effect, however, of making the underlying function less reliable (due to the introduction of noise into the data).

Another technique to accomplish differential privacy is called the exponential mechanism, which is more complex but offers better accuracy. Another advantage of the exponential mechanism is that, as will be shown, it can be efficiently implemented as a scalable secure computation. Furthermore, the exponential mechanism can implement any differentially private algorithm.

The exponential mechanism expands the application of differential privacy to functions with non-numerical output, or when the output is not robust to additive noise, such as when the function is a median function. The exponential mechanism selects a result from a fixed set of arbitrary outputs $\mathcal{R}$ while satisfying differential privacy. This mechanism is exponentially more likely to select "good' results, where "good" is quantified by a utility function u(D,r), which takes as input a database $D \in \mathcal{D}$ (where $\mathcal{D}$ denotes the set of all possible databases) and a potential output $r \in \mathcal{R}$. Informally, higher utility means the output is more desirable and its selection probability is increased accordingly. Thus:

For any utility function u: $(\mathcal{D}^n \times \mathcal{R}) \to \mathbb{R}$ and a privacy parameter $\epsilon$, the exponential mechanism $M_u^\epsilon(D)$ outputs $r \in \mathcal{R}$ with probability proportional to $\exp\left(\frac{\epsilon u(D, r)}{2\Delta u}\right)$, where $\Delta u = \max_{\forall r \in R, D \simeq D'} |u(D, r) - u(D', r)|$ is the sensitivity of the utility function. That is, $$Pr[M_u^\epsilon(D) = r] = \frac{\exp\left(\frac{\epsilon u(D, r)}{2\Delta u}\right)}{\Sigma_{r' \in R} \exp\left(\frac{\epsilon u(D, r')}{2\Delta u}\right)}.$$

There are two types of privacy techniques that are used in exponential mechanisms. The first is a trusted model, in which a central "curator" computes and anonymizes data centrally. While accuracy in the trusted model is high, privacy is not, and as described briefly above there are certain types of data that are unable to be shared with even a trusted curator for legal reasons. The second type is an untrusted model. Here, computations and anonymization is performed locally, which results in more privacy but less accuracy.

Secure computation is used for input secrecy, namely the data itself is never shared between parties. In an example embodiment, secure computation is used to simulate a central (trusted) model in a local (untrusted) model. This is accomplished by the parties simulating trusted third-party techniques via cryptographic protocols.

More particularly, in an example embodiment, a "restricted" exponential mechanism is computed for sub-ranges of data. By restricting the exponential mechanism, efficiency in computing the function is increased. Specifically, the "restriction" involved is to only consider "composable functions". Composable functions are those that are easy to combine, to allow for efficient computation. Specifically, first the parties compute the partial result locally, without interaction with others, without secure computation, then the parties combine the partial results into a global one, with interaction with others, with secure computation.

By dividing a potentially very large data universe (e.g., billions of possible values) into subranges and computing selection probabilities for them, this solution is much faster (sublinear in universe size) than computing selection probabilities for each possible data element (linear in universe size).

Assume n parties, each holding a single value $d_i \in D$ (we can generalize to multiple values). To combine local utility scores per player into a global score for all, the utility functions may be composable:

DEFINITION 3 (COMPOSABILITY). We call a utility function u: $(\mathcal{D}^n \times \mathcal{R}) \to \mathbb{R}$ composable w.r.t. function u': $(\mathcal{D}^n \times \mathcal{R}) \to \mathbb{R}$ if $$u(D, x) = \sum_{i=1}^{n} u'(d_i, x)$$

for $x \in \mathcal{R}$ and $D = \{d_1, \ldots, d_n\}$.

We use composability to easily combine utility scores in Weights$^{ln(2)/2^d}$, and to avoid secure evaluation of the exponential function in Weights*. General secure exponentiation is complex (e.g., binary expansions, polynomial approximations) and we want to avoid its computation overhead. If u is composable, users can compute weights locally, and securely combine them via simple multiplications:

$$\prod \exp(u'(D_i, x)\epsilon) = \exp\left(\sum u'(D_i, x)\epsilon\right) = \exp(u(D, x)\epsilon).$$

There are a wide variety of selection problems that satisfy this composability definition. This includes rank-based statistics such as median, convex operations, unlimited supply auctions, and frequency-based statistics. For purposes of this discussion, a composable median utility function is described. Here, we quantify an element's utility via its rank relative to the median. The rank of $X \in \mathcal{D}$ with respect to D is the number of values in D smaller than x. We use the following composable median utility function:
The median utility function $u_{med}^c: (\mathcal{D}^n \times \mathcal{D}) \to Z$ gives a utility score for a range $R=[r_l, r_u]$ of $\mathcal{D}$ w.r.t $D \in \mathcal{D}^n$ as $$u_{med}^c(D, R) = \begin{cases} rank_D(r_u) & \text{if } rank_D(r_u) < \frac{n}{2} \\ n - rank_D(r_l) & \text{if } rank_D(r_u) > \frac{n}{2} \\ \frac{n}{2} & \text{else} \end{cases}$$

The sensitivity of $u_{med}^c$ is ½ since adding an element increases n/2 by ½ and j either increases by 1 or remains the same [25]. Thus, the denominator $2\Delta u$ in the exponents of Equation (1) equals 1, and we will omit it in the rest of this work.

Figure 2:
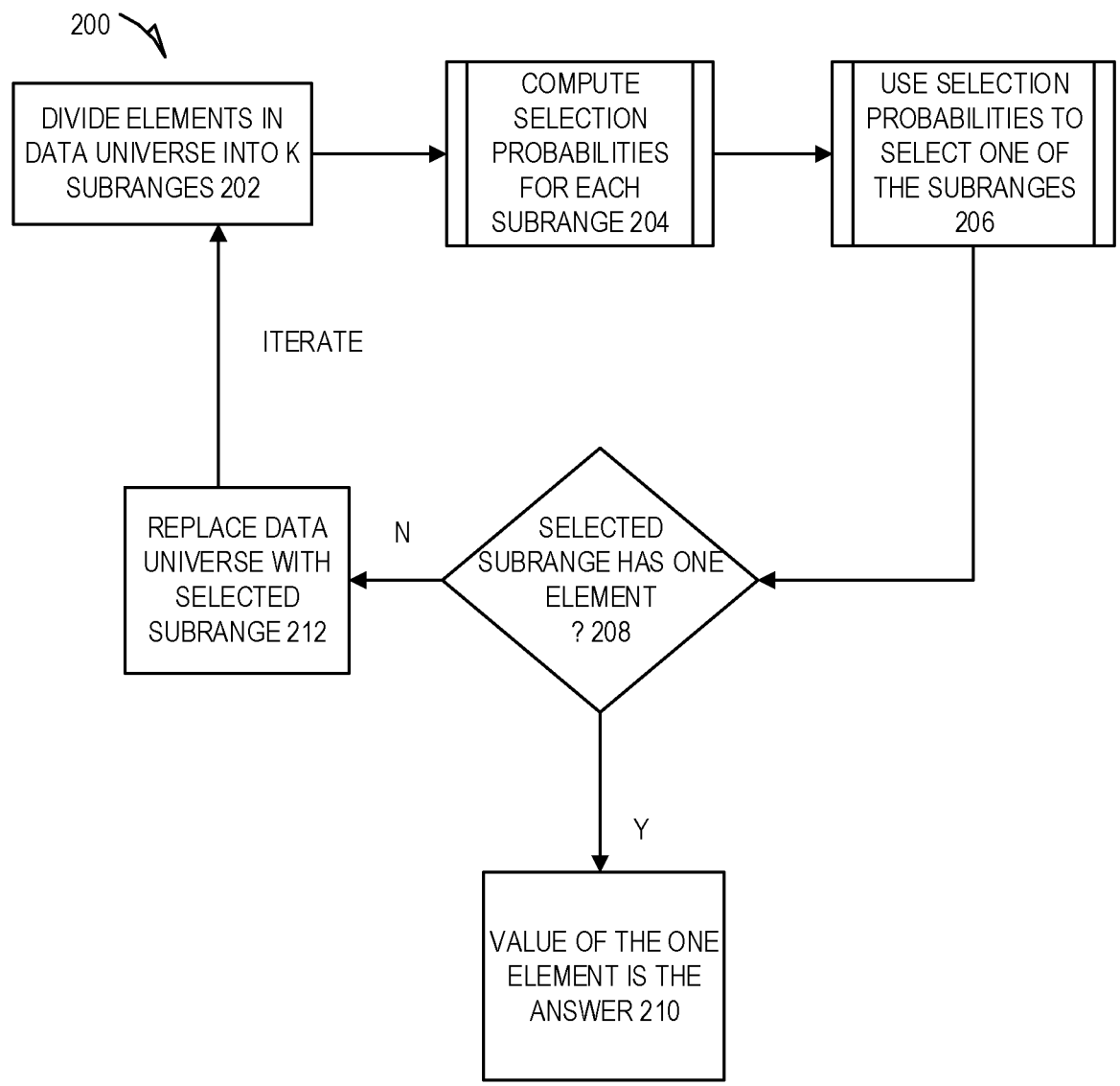
FIG. 2 is a flow diagram illustrating a method of computation of a secure multiparty differentially private function, in accordance with an example embodiment.

FIG. 2 is a flow diagram illustrating a method 200 of computation of a secure multiparty differentially private function, in accordance with an example embodiment. At operation 202, all elements in a data universe are divided into k subranges. All elements in a data universe may be defined as all the possible values output by the function. At operation 204, selection probabilities are computed for each subrange. This will be described in more detail with respect to FIGS. 4 and 5 below. Generally, however, either method 400 of FIG. 4 or method 500 of FIG. 5 is used to compute the selection probabilities. The choice between using method 400 or method 500 is based on how important privacy and speed are to a user controlling the software. Method 400 is faster but has less privacy, while method 500 is slower but has more privacy. A user defined privacy parameter c can be used to represent the user's choice, and method 400 may be used if c can be expressed as $\epsilon = \ln(2)/2^d$ for some integer d).

At operation 206, the selection probabilities (which can also be called weights) are used to select one of the subranges (essentially, the subrange most likely to contain the actual function result, e.g., the subrange most likely to contain the median). This will be described in more detail respect to FIG. 3 below. At operation 208, it is determined if the selected subrange has a size of one element. If so, then at operation 210 the value of that one element is considered to be the "answer" to the function (e.g., the median). If not, then at operation 212, the data universe is replaced with the selected subrange and the method 200 returns to operation 202 to subdivide the selected subrange. Thus, method 200 recursively evaluates each smaller and smaller subrange until the specific output value is determined. Furthermore, by dividing a potentially large data universe into subranges, this process is much more efficient than computing selection probabilities for each possible value.

It should be noted that the selection probabilities are non-normalized weights, rather than probabilities that have been normalized to sum to 1.

Figure 3:
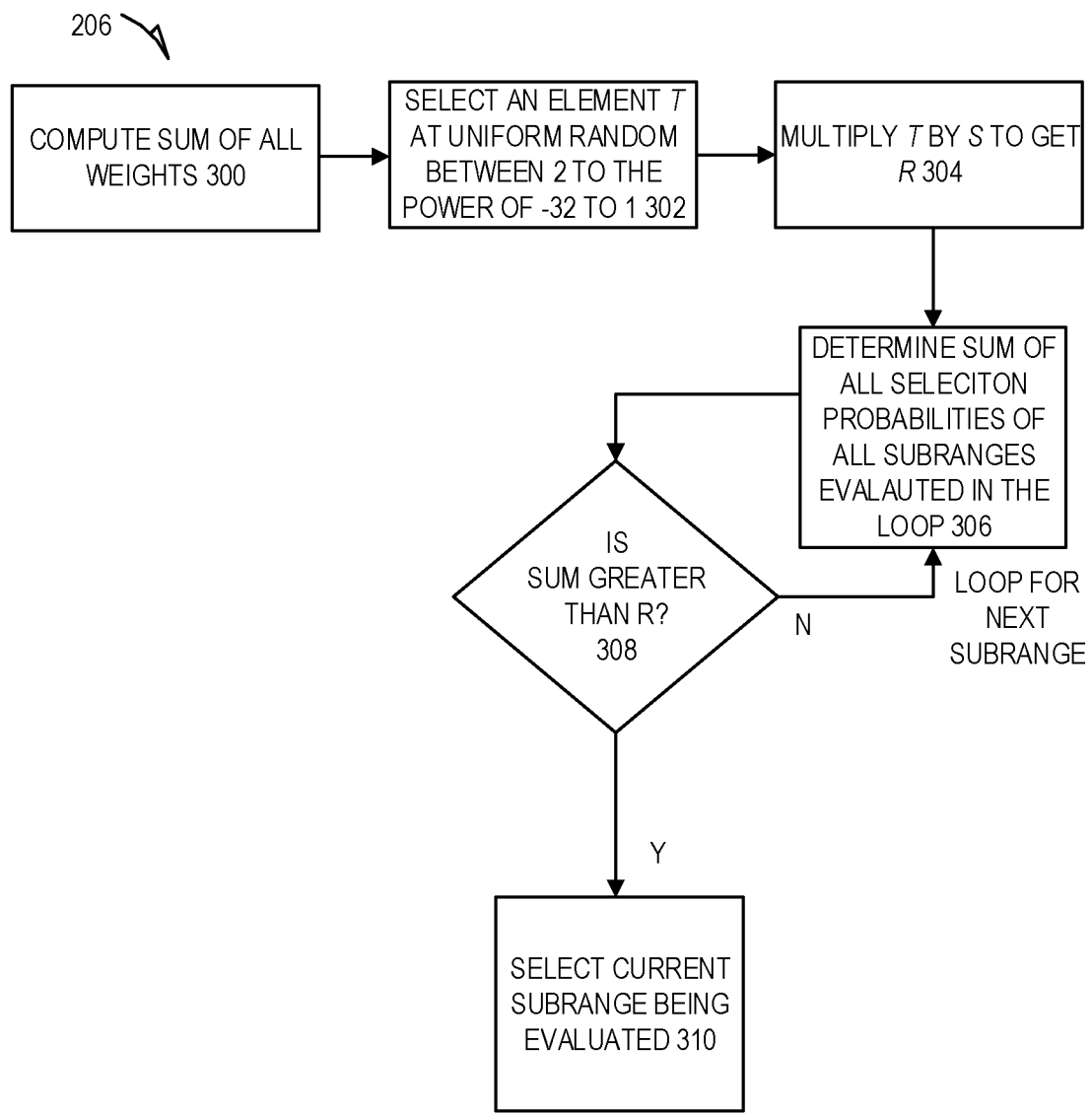
FIG. 3 is a flow diagram illustrating a method of using selection probabilities to select one of a plurality of subranges, in accordance with an example embodiment.

FIG. 3 is a flow diagram illustrating a method 206 of using selection probabilities to select one of a plurality of subranges, in accordance with an example embodiment. The selection probabilities (weights) inform as to how likely each subrange is to be selected. In other words, they define a probability distribution over the subranges. At operation 300, the sum of all weights is computed. This may be called s. Then, at operation 302, an element t at uniform random between 2 to the power of −32 to 1 is selected. Then, at operation 304, t is multiplied by s to get a random value r between nearly 0 and s. These are the initial selection probabilities.

A loop is then begun where each of the selection probabilities (weights) are stepped through in order, stopping when a condition is met and choosing the subrange corresponding to the current selection probability in the loop. Specifically, beginning with the first subrange, at operation 306, a sum of the selection probabilities of all subranges evaluated in the loop is determined. Thus, the first time in the loop this sum will simply be the selection probability for the first subrange, the second time in the loop this sum will be the sum of the selection probabilities for the first and second subrange, the third time in the loop this sum will be the selection probability for the first, second, and third subranges, and so on.

At operation 308, it is determined whether the sum from operation 306 is greater than r. If so, then at operation 310 the subrange currently being evaluated in this loop is selected and method 300 ends. If not, then the method 300 loops back to operation 306, for the next subrange.

Figure 4:
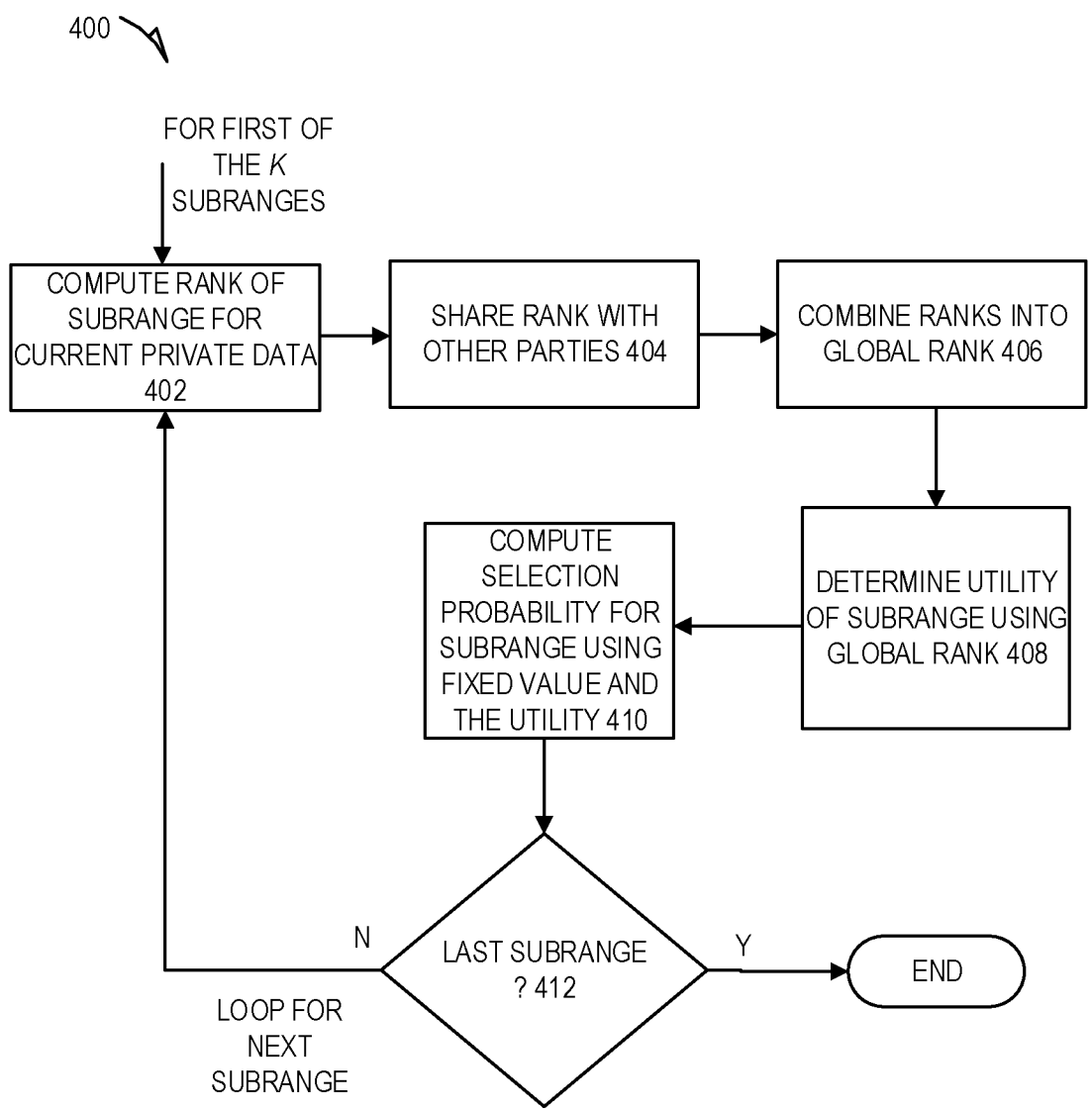
FIG. 4 is a flow diagram illustrating a method for computing selection probabilities for each subrange in accordance with an example embodiment.
Figure 5:
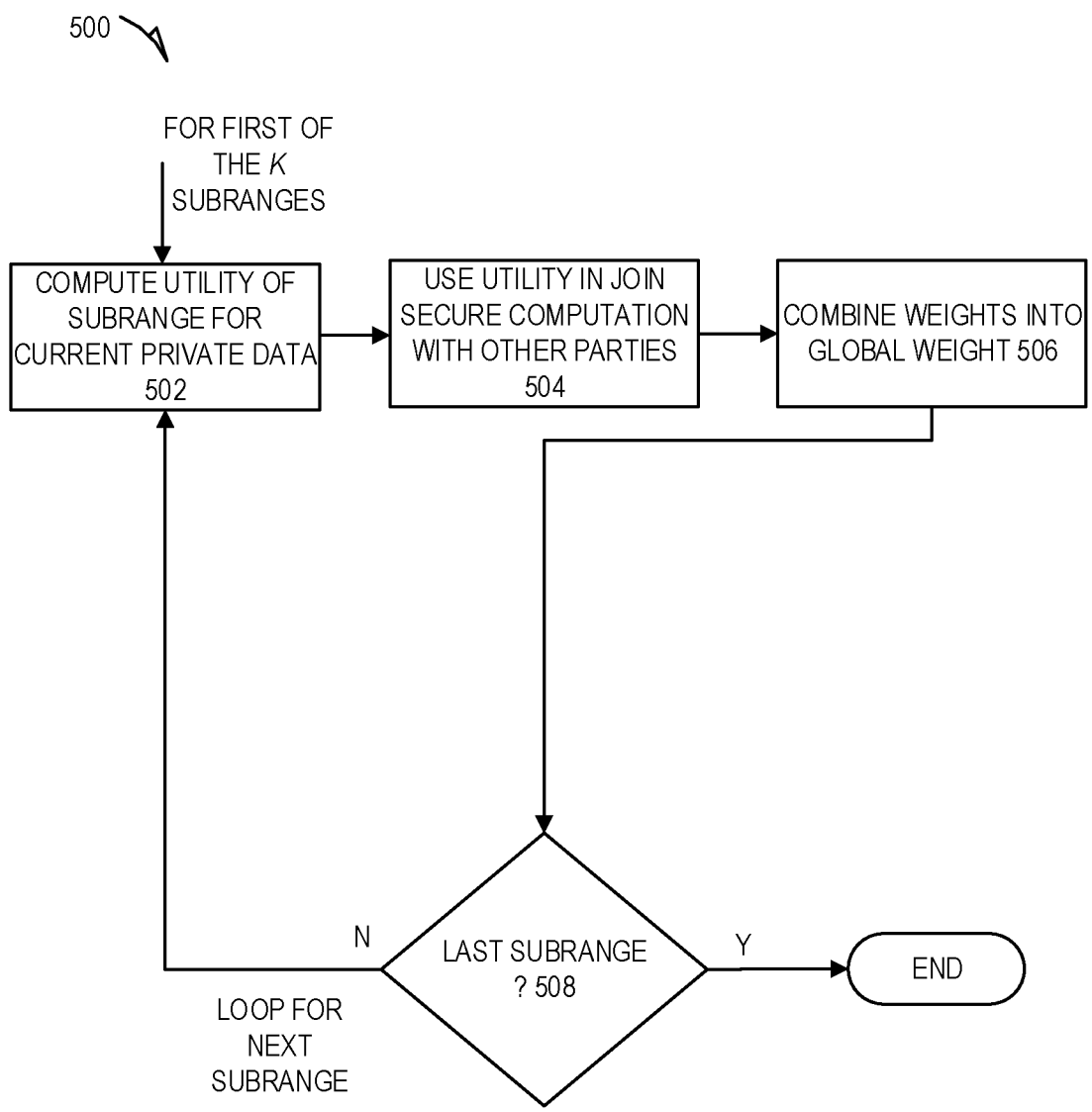
FIG. 5 is a flow diagram illustrating a method for computing selection probabilities for each subrange in accordance with another example embodiment.

FIG. 4 is a flow diagram illustrating a method 400 for computing selection probabilities for each subrange in accordance with an example embodiment. Here, the selection probabilities use complicated computations (exponential functions of the product of the privacy parameter and the rank, where the rank is the position of an element in the sorted data). They are slow with secure computation. Thus, this may be avoided by letting parties compute the rank and compute powers of two instead of an exponential function.

A loop is begun at the first of the k subranges. At operation 402, the rank of the subrange for the current private data is computed. The current private data is the data available to the party executing the method 400, thus, in the example of FIG. 1, party 102A evaluates operation 402 with respect to data in database 104A, party 102B evaluates operation 402 with respect to data in database 104B, and so on. At operation 404, the rank determined at operation 402 is shared with the at least one other party. Thus, if method 400 is currently being executed by party 102A, the calculated rank is shared with parties 102B and 102C. The result is that each of the parties' version of method 400 will now have the ranks computed by each of the at least one other party, without having access to the underlying data of the at least one other party. At operation 406, the ranks are combined into a global rank. This may be performed by, for example, adding the ranks together.

At operation 408, the utility of the subrange is determined using the global rank. This is determined by taking the smallest distance between a boundary of the subrange and the median rank in the subrange. Thus, for example, if the subrange considers elements 1 through 5, the utility is determined by computing the distance between the value for element 1 in the global rank and the median for the global rank, and computing the distance between the value for element 5 in the global rank and the median in the global rank, and then taking the lesser of these computed distances. The median in the global rank is computed as n/2, where n is the size of the combined datasets. Thus, if the combined dataset has 8 elements, the median is at rank 4. If element 1 in the subrange is at rank 2 in the combined rank, while element 5 in the subrange is at rank 7, then the closest of these two elements is element 1, which is at a distance of 2 from the median (2 spots away from rank 4). Thus, the utility of this subrange is calculated at 2. There are three options:

(1) The median is contained in the subrange, then the utility score for the subrange is the same as the utility for the median (n/2)

(2) The subrange does not contain the median and the subrange endpoints are smaller than the median (e.g., median=4 and subrange contains elements 1, 2, 3), then the utility is the same as for the subrange endpoint that is closer to the median (e.g., endpoints for subrange containing elements 1, 2, 3 are 1 and 2 and the latter is closer to median 4 than 1, thus we use the utility for endpoint 2). Here the utility is n/2 minus the rank of the larger subrange endpoint.

(3) Same as (2) but endpoints are larger than the median. Here the utility is the rank of the smaller subrange minus n/2.

Note that in case (2), one can always the larger endpoint (denoted $r_u$ in [0030]), and in case (3), one can always use the smaller one ($r_l$)

At operation 410, a selection probability (weight) for this subrange is computed using a fixed value and the utility. This fixed value may be designated as $\varepsilon$. In an example embodiment, $\varepsilon$ is set to ln(2), and the selection probability (weight) for the subrange is computed as exp(utility*$\varepsilon$). The result is that in this example embodiment, the weight is equal to $2^{utility}$ which can be more efficiently computed with secure computation than general exponentiation. At operation 412, it is determined if this is the last subrange in the k subranges. If so, then the method 400 ends. If not, then the method 400 loops back to operation 402 for the next subrange.

FIG. 5 is a flow diagram illustrating a method 500 for computing selection probabilities for each subrange in accordance with another example embodiment. Here, rather than the parties computing the local ranks, they compute local (or partial) weights. The local weights are then combined into global ranks. This results in a method that is slower than method 400 but offers better privacy.

A loop is begun at the first of the k subranges. At operation 502, the utility of the subrange for the current private data is computed. The current private data is the data available to the party executing the method 500, thus, in the example of FIG. 1, party 102A evaluates operation 502 with respect to data in database 104A, party 102B evaluates operation 502 with respect to data in database 104B, and so on. The weight (i.e., unnormalized selection probability) of the subrange for the current private data may be computed by performing an exponent function on the rank of the subrange in the current private data. This involves bringing a constant to the power of a function applied on the rank. In an example embodiment, this constant is e. At operation 504, the utility determined at operation 502 is used in a joint secure computation with the at least one other party. Thus, if method 500 is currently being executed by party 102A, this joint secure computation is additionally performed with parties 102B and 102C. At operation 506, the weights are combined into a global weight. This may be performed by, for example, multiplying the weights together. This global weight is the selection probability (weight) of this subrange. At operation 508, it is determined if this is the last subrange in the k subranges. If so, then the method 500 ends. If not, then the method 500 loops back to operation 502 for the next subrange.

At a programming level, these methods may be implemented using a series of pseudocode algorithms, as follows:

---

Algorithm MEDIANSELECTION

Input: Number of subranges k, size n of combined data D, and $\varepsilon$.
  Data universe $\mathcal{D}$ is known to all parties.
Output: Differentially private median of D.
 1: $r_l, r_u \leftarrow 0, |\mathcal{D}|$
 2: for 1 to $\lceil \log_k |\mathcal{D}| \rceil$ do
 3: $r_\# \leftarrow \lfloor \frac{r_u - r_l}{k} \rfloor$
 4: Define array W of size k
 5: if $\varepsilon = \ln(2)/2^d$ then
 6: $\langle W \rangle \leftarrow$ Weights$^{ln(2)/2d}$ ($r_l, r_u, r_\#$, k, n, d)
 7: else
 8: $\langle W \rangle \leftarrow$ Weights* ($r_l, r_u, r_\#$, k, n, $\varepsilon$)
 9: end if
10: i $\leftarrow$ INDEXSAMPLING($\langle W \rangle$)
11: $r_l \leftarrow r_l + i \cdot r_\#$
12: $r_u \leftarrow r_u$ if $i = k - 1$ else $r_l + (i + 1) \cdot r_\#$
13: end for
14: return $\mathcal{D}[r_l]$

---

Algorithm INDEXSAMPLING.

Input: List $\langle W \rangle$ of weights with size k.
Output: Index $i \in [0, k - 1]$ sampled according to $\langle W \rangle$.
 1:  $\langle s \rangle \leftarrow 0$
 2:  for $j \leftarrow 0$ to $k - 1$ do
 3:   $\langle s \rangle \leftarrow$ FLAdd($\langle s \rangle, \langle W[i] \rangle$)
 4:  end for
 5:  $\langle t \rangle \leftarrow$ FLRand(32)
 6:  $\langle r \rangle \leftarrow$ FLMul($\langle s \rangle, \langle t \rangle$)
 7:  for $j \leftarrow 0$ to $k - 1$ do
 8:   $\langle r \rangle \leftarrow$FLAdd($\langle r \rangle, \langle -W[j] \rangle$)
 9:   return j if FLLTZ($\langle r \rangle$)
10:  end for
11:  return $k - 1$

---

Algorithm Weights$^{ln(2)/2d}$.

Input: Range [$r_l, r_u$), subrange size $r_\#$, number k of subranges, data size n, and parameter $d \in \{0, 1\}$. Subrange ranks rank$_{D_p}(\cdot)$ are input by each party $p \in \{1, \ldots, q\}$.
Output: List of weights.
 1: Define arrays $R^l, R^u$, W of size k, initialize $R^l, R^u$ with zeros
 2: for $p \leftarrow 1$ to q do //Get input from each party
 3:  for $j \leftarrow 0$ to $k - 1$ do //Divide range into k subranges
 4:   $r_l \leftarrow r_l + j \cdot r_\#$
 5:   $\langle R^l[j] \rangle \leftarrow$ Add($\langle Rl[j] \rangle, \langle$rank$_{D_p}(\mathcal{D}[r_l]) \rangle$)
 6:   $\langle R^u[j - 1] \rangle \leftarrow$ Add($\langle R^u[j - 1] \rangle, \langle$rank$_{D_p}(\mathcal{D}[r_l]) \rangle$) if $j > 0$
 7:  end for
 8:  $\langle R^u[k - 1] \rangle \leftarrow$ Add($\langle R^u[k - 1] \rangle, \langle$rank$_{D_p}(\mathcal{D}[r_u]) \rangle$)
 9: end for
10: for $j \leftarrow 0$ to $k - 1$ do
11:  $\langle$rank$_l \rangle \leftarrow$ Add($\langle n \rangle, \langle -R^l[j] \rangle$)
12:  $\langle c_u \rangle \leftarrow LT\left(\langle R^u[j] \rangle, \left\langle \frac{n}{2} \right\rangle \right)$
13:  $\langle c_l \rangle \leftarrow LT\left(\left\langle \frac{n}{2} \right\rangle, \langle R^l[j] \rangle \right)$
14:  $\langle u \rangle \leftarrow$ CondSel $\left(\langle R^u[j] \rangle, \langle$rank$_l \rangle, \left\langle \frac{n}{2} \right\rangle, \langle c_u \rangle, \langle c_l \rangle \right)$
15:  if $d = 0$ then
16:   $\langle W[j] \rangle \leftarrow$ FLExp2($\langle u \rangle$)
17:  else
18:   $\langle t \rangle \leftarrow$ Trunc($\langle u \rangle$, d)
19:   $\langle e \rangle \leftarrow$ FLExp2($\langle t \rangle$)
20:   $\langle r \rangle \leftarrow$ Mod2m($\langle u \rangle$, d)
21:   $\langle c \rangle \leftarrow$ EQZ($\langle r \rangle$)
22:   $\langle s \rangle \leftarrow$ FLSwap($\langle 1 \rangle, \langle \sqrt{2} \rangle, \langle c \rangle$)

-continued

Algorithm Weights$^{ln(2)/2d}$.

23:     $\langle W[j] \rangle \leftarrow$ FLMul($\langle e \rangle, \langle s \rangle$)
24:   end
25: end for
26: return $\langle W \rangle$

---

4 Algorithm Weights*.

Input: Range $[r_l, r_u)$, subrange size $r_\#$, number k of subranges,
    data size n, and $\epsilon$. Subrange weights $e^{\epsilon(\cdot)}$ are input by each
    party $p \in \{1, \ldots, q\}$.
Output: List of weights.
 1: Define arrays $W^l$, $W^u$, W of size k, initialize $W^l$, $W^u$ with ones
 2: $w_{med} \leftarrow \exp\left(\frac{n}{2}\epsilon\right)$
 3: for $p \leftarrow 1$ to q do //Get input from each party
 4:    for $j \leftarrow 0$ to $k - 1$ do //Divide range into k subranges
 5:        $r_l \leftarrow r_l + j \cdot r_\#$
 6:        $r_u \leftarrow r_u$ if $j = k - 1$ else $r_l + (j + 1) \cdot r_\#$
 7:        $\langle W_l[j] \rangle \leftarrow$ FLMul($\langle W^l[j] \rangle, \langle e^{\epsilon(|D_p| - \text{rank}_{D_p}(\mathcal{D}[r_l]))} \rangle$)
 8:        $\langle W^u[j] \rangle \leftarrow$ FLMul($\langle W^u[j] \rangle, \langle e^{\epsilon \cdot \text{rank}_{D_p}(\mathcal{D}[r_u])} \rangle$)
 9:    end for
10: end for
11: for $j \leftarrow 0$ to $k - 1$ do
12:    $\langle c_u \rangle \leftarrow$ FLLET($\langle W^u[j] \rangle, \langle w_{med} \rangle$)
13:    $\langle c_l \rangle \leftarrow$ FLLT($\langle W^l[j] \rangle, \langle w_{med} \rangle$)
14:    $\langle W[j] \rangle \leftarrow$ FLCondSel($\langle W^u[j] \rangle, \langle W^l[j] \rangle, \langle w_{med} \rangle$,
        $\langle c_u \rangle, \langle c_l \rangle$)
15: end for
16: return $\langle W \rangle$ With the following secure computation protocols:

| Secure Protocol | Functionality/Output |
| --- | --- |
| Add($\langle a \rangle, \langle b \rangle$) | a + b |
| LT($\langle a \rangle, \langle b \rangle$) | returns 1 if the first operand is less than the second and 0 otherwise |
| LET($\langle a \rangle, \langle b \rangle$) | 1 if a $\leq$ b else 0 |
| EQZ($\langle a \rangle$) | 1 if a = 0 else 0 |
| EQ($\langle a \rangle, \langle b \rangle$) | 1 if a equals b else 0 |
| Mod2m($\langle a \rangle$, b) | a mod $2^b$ for public b |
| Trunc($\langle a \rangle$, b) | $[a/2^b]$ for public b |
| CondSel($\langle x \rangle, \langle y \rangle, \langle z \rangle, \langle c_1 \rangle, \langle c_2 \rangle$) | x if $c_1 = 1$, y if $c_2 = 1$, and z if both $c_0$ and $c_1$ are zero (a new sharing is output) |
| FLMul($\langle a \rangle, \langle b \rangle$) | a · b |
| FLExp2($\langle a \rangle$) | $2^a$ |
| FLLTZ($\langle a \rangle$) | 1 if a less than zero else 0 |
| FLRand(b) | a uniform random float in $(2^{-b}, 1.0]$ for public b |
| FLSwap($\langle a \rangle, \langle b \rangle, \langle c \rangle$) | a if c = 1 otherwise b (a new sharing is output) |

FLAdd($\langle a \rangle, \langle b \rangle$), FLLT($\langle a \rangle, \langle b \rangle$), FLLET($\langle a \rangle, \langle b \rangle$), FLCondSel($\langle x \rangle, \langle y \rangle, \langle z \rangle, \langle c_1 \rangle, \langle c_2 \rangle$) are the float versions of the integer protocols with the same name Floating points are marked with the prefix FL. All inputs and outputs may be secret shared, denoted by angle brackes < >, which is a cryptographic primitive for secure computation.

EXAMPLES

Example 1. A system comprising:
   at least one hardware processor; and
   a computer-readable medium storing instructions that, when executed by the at least one hardware processor, cause the at least one hardware processor to perform operations comprising, at a first party in a multiparty system having a plurality of parties with their own independent databases:
      identifying a function to be evaluated over a range of data contained in a database of the first party;
      dividing the range into a plurality of subranges of data;
      computing, for each of the plurality of subranges of data, a selection probability for the subrange, based on information received about each of the plurality of subranges of data from at least one other party in the multiparty system;
      selecting one of the plurality of subranges of data based on the selection probability;
      dividing the selected subrange into additional subranges; and
      recursively iterating the computing, the selecting, dividing, and repeating for the additional subranges, until the selected subrange has a size of one, each iteration being performed on subranges of the selected subrange from an immediately previous iteration.

Example 2. The system of Example 1, wherein the selecting includes:
   for each of the plurality of subranges:
      computing the rank of the subrange for data contained in the database of the first party;
      jointly securely computing the rank of the subrange for data with at least one other party in the multiparty system;
      combining the rank of the subrange of data from the at least one other party and the rank of the subrange for data contained in the database of the first party in to a global rank;
      determining a utility of the subrange using the global rank; and
      calculating a selection probability for the subrange using a fixed value and the utility.

Example 3. The system of Example 2, wherein the combining includes adding the ranks.

Example 4. The system of Examples 2 or 3, wherein the fixed value is ln(2).

Example 5. The system of any of Examples 1-4, wherein the selecting includes:
   for each of the plurality of subranges:
      computing the rank of the subrange for data contained in the database of the first party;

calculating a utility for the subrange based on the rank;
jointly securely computing the weight of the subrange for data with at least one other party in the multiparty system; and
determining a selection probability for the subrange by combining the weights for the subrange.

Example 6. The system of Example 5, wherein the combining includes multiplying the weights.

Example 7. The system of Example 1, wherein a selection probability for a particular subrange is a likelihood that the particular subrange will be selected.

Example 8. A method comprising:
at a first party in a multiparty system having a plurality of parties with their own independent databases:
identifying a function to be evaluated over a range of data contained in a database of the first party;
dividing the range into a plurality of subranges of data;
computing, for each of the plurality of subranges of data, a selection probability for the subrange, based on information received about each of the plurality of subranges of data from at least one other party in the multiparty system;
selecting one of the plurality of subranges of data based on the selection probability;
dividing the selected subrange into additional subranges; and
recursively iterating the computing, the selecting, dividing, and repeating for the additional subranges, until the selected subrange has a size of one, each iteration being performed on subranges of the selected subrange from an immediately previous iteration.

Example 9. The method of Example 8, wherein the selecting includes:
for each of the plurality of subranges:
computing the rank of the subrange for data contained in the database of the first party;
jointly securely computing the rank of the subrange for data with at least one other party in the multiparty system;
combining the rank of the subrange of data from the at least one other party and the rank of the subrange for data contained in the database of the first party in to a global rank;
determining a utility of the subrange using the global rank; and
calculating a selection probability for the subrange using a fixed value and the utility.

Example 10. The method of Example 9, wherein the combining includes adding the ranks.

Example 11. The method of Example 9 or 10, wherein the fixed value is ln(2).

Example 12. The method of any of Examples 8-11, wherein the selecting includes:
for each of the plurality of subranges:
computing the rank of the subrange for data contained in the database of the first party;
calculating a utility for the subrange based on the rank;
jointly securely computing the weight of the subrange for data with at least one other party in the multiparty system; and
determining a selection probability for the subrange by combining the weights for the subrange.

Example 13. The method of Example 12, wherein the combining includes multiplying the weights.

Example 14. The method of Example 12, wherein the calculating a utility includes bringing e to the power of the rank.

Example 15. A non-transitory machine-readable medium storing instructions which, when executed by one or more processors, cause the one or more processors to perform operations comprising:
at a first party in a multiparty system having a plurality of parties with their own independent databases:
identifying a function to be evaluated over a range of data contained in a database of the first party;
dividing the range into a plurality of subranges of data;
computing, for each of the plurality of subranges of data, a selection probability for the subrange, based on information received about each of the plurality of subranges of data from at least one other party in the multiparty system;
selecting one of the plurality of subranges of data based on the selection probability;
dividing the selected subrange into additional subranges; and
recursively iterating the computing, the selecting, dividing, and repeating for the additional subranges, until the selected subrange has a size of one, each iteration being performed on subranges of the selected subrange from an immediately previous iteration.

Example 16. The non-transitory machine-readable medium of Example 15, wherein the selecting includes:
for each of the plurality of subranges:
computing the rank of the subrange for data contained in the database of the first party;
jointly securely computing the rank of the subrange for data with at least one other party in the multiparty system;
combining the rank of the subrange of data from the at least one other party and the rank of the subrange for data contained in the database of the first party in to a global rank;
determining a utility of the subrange using the global rank; and
calculating a selection probability for the subrange using a fixed value and the utility.

Example 17. The non-transitory machine-readable medium of Example 16, wherein the combining includes adding the ranks.

Example 18. The non-transitory machine-readable medium of Example 16 or 17, wherein the fixed value is ln(2).

Example 19. The non-transitory machine-readable medium of any of Examples 15-18, wherein the selecting includes:
for each of the plurality of subranges:
computing the rank of the subrange for data contained in the database of the first party;
calculating a utility for the subrange based on the rank;
jointly securely computing the weight of the subrange for data with at least one other party in the multiparty system; and
determining a selection probability for the subrange by combining the weights for the subrange.

Example 20. The non-transitory machine-readable medium of Example 19, wherein the combining includes multiplying the weights.

Figure 6:
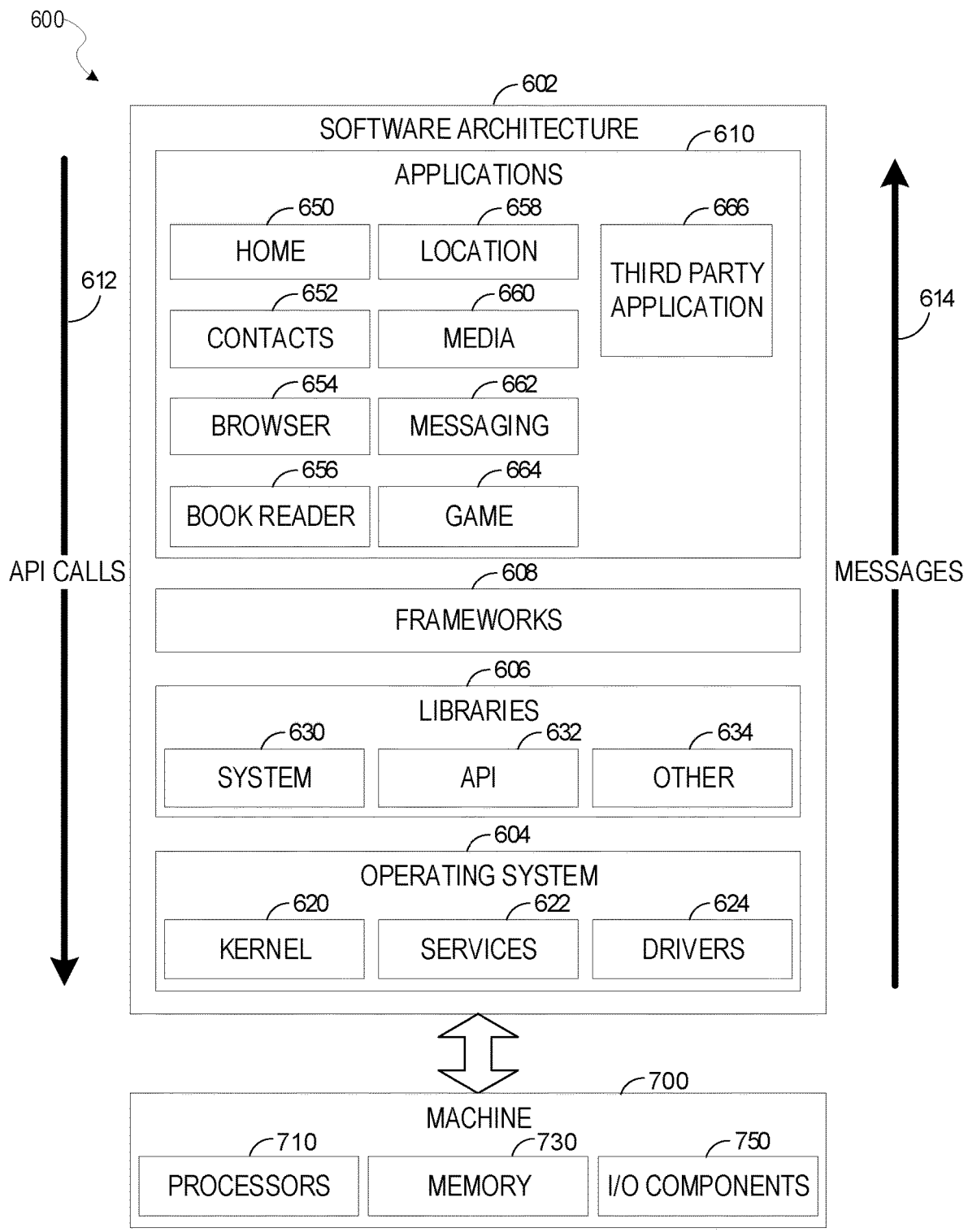
FIG. 6 is a block diagram illustrating an architecture of software, which can be installed on any one or more of the devices described above.

FIG. 6 is a block diagram 600 illustrating a software architecture 602, which can be installed on any one or more of the devices described above. FIG. 6 is merely a non-limiting example of a software architecture, and it will be appreciated that many other architectures can be implemented to facilitate the functionality described herein. In various embodiments, the software 602 is implemented by hardware such as a machine 700 of FIG. 7 that includes processors 710, memory 730, and input/output (I/O) components 750. In this example architecture, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke API calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphical user interface (GUI) functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications, such as a third-party application 666. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

Figure 7:
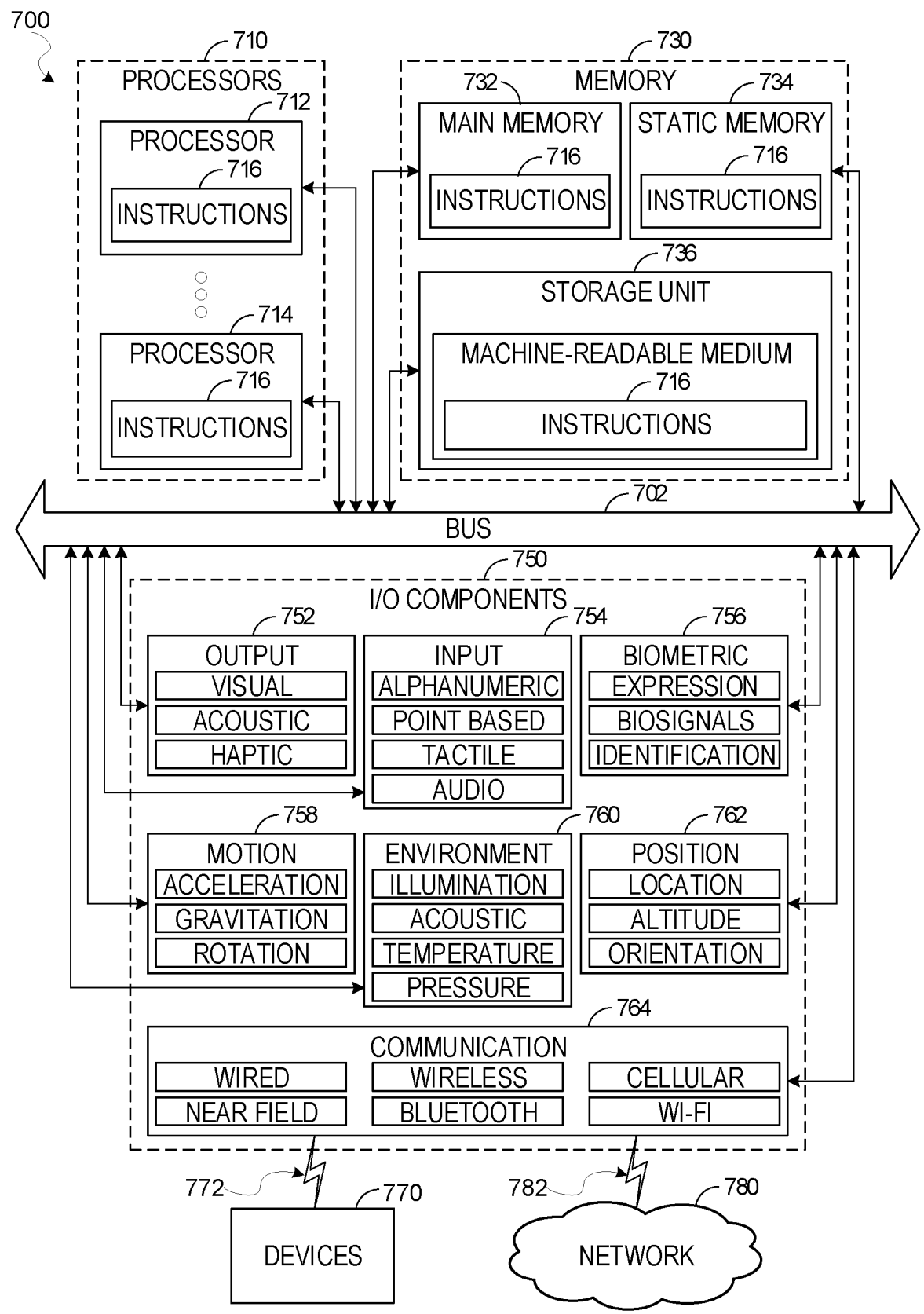
FIG. 7 illustrates a diagrammatic representation of a machine in the form of a computer system within which a set of instructions may be executed for causing the machine to perform any one or more of the methodologies discussed herein, according to an example embodiment.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute the methods of FIGS. 2-5. Additionally, or alternatively, the instructions 716 may implement FIGS. 1-5 and so forth. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors that may comprise two or more independent processors (sometimes referred to as "cores") that may execute instructions 716 contemporaneously. Although FIG. 7 shows multiple processors 710, the machine 700 may include a single processor 712 with a single core, a single processor 712 with multiple cores (e.g., a multi-core processor 712), multiple processors 712, 714 with a single core, multiple processors 712, 714 with multiple cores, or any combination thereof.

The memory 730 may include a main memory 732, a static memory 734, and a storage unit 736, each accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion, and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., coupled via a USB).

Moreover, the communication components 764 may detect identifiers or include components operable to detect identifiers. For example, the communication components 764 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

The various memories (i.e., 730, 732, 734, and/or memory of the processor(s) 710) and/or the storage unit 736 may store one or more sets of instructions 716 and data structures (e.g., software) embodying or utilized by any one or more of the methodologies or functions described herein. These instructions (e.g., the instructions 716), when executed by the processor(s) 710, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., Hypertext Transfer Protocol (HTTP)). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations comprising, at a first party in a multiparty system having a plurality of parties with their own independent databases:
   receiving a request via a network to evaluate a function over a range of data contained in a database of the first party;
   dividing the range into a plurality of subranges of data;
   securely computing, for each of the plurality of subranges of data, a selection probability for the subrange, based on information received about each of the plurality of subranges of data from at least one other party in the multiparty system, the at least one other party in the multiparty system providing the information based on data not shared with the first party;
   selecting one of the plurality of subranges of data based on the selection probability;
   dividing the selected subrange into additional subranges;
   recursively iterating the computing, the selecting, dividing, and repeating for the additional subranges, until the selected subrange has a size of one, each iteration being performed on subranges of the selected subrange from an immediately previous iteration; and
   returning a result via the network to the request, the request including data from the selected subrange with a size of one.

2. The system of claim 1, wherein the selecting includes:
   for each of the plurality of subranges:
   computing a rank of the subrange for data contained in the database of the first party;
   jointly securely computing the rank of the subrange for data with at least one other party in the multiparty system;
   combining the rank of the subrange of data from the at least one other party and the rank of the subrange for data contained in the database of the first party in to a global rank;
   determining a utility of the subrange using the global rank; and
   calculating a selection probability for the subrange using a fixed value and the utility.

3. The system of claim 2, wherein the combining includes adding the ranks.

4. The system of claim 2, wherein the fixed value is ln(2).

5. The system of claim 1, wherein the selecting includes:
   for each of the plurality of subranges:
   computing a rank of the subrange for data contained in the database of the first party;
   calculating weights for the subrange based on the rank;
   jointly securely computing the weight of the subrange for data with at least one other party in the multiparty system; and
   determining a selection probability for the subrange by combining the weights for the subrange.

6. The system of claim 5, wherein the combining includes multiplying the weights.

7. The system of claim 1, wherein a selection probability for a particular subrange is a likelihood that the particular subrange will be selected.

8. A method comprising:
at a first party in a multiparty system having a plurality of parties with their own independent databases:
receiving a request via a network to evaluate a function over a range of data contained in a database of the first party;
dividing the range into a plurality of subranges of data;
securely computing, for each of the plurality of subranges of data, a selection probability for the subrange, based on information received about each of the plurality of subranges of data from at least one other party in the multiparty system, the at least one other party in the multiparty system providing the information based on data not shared with the first party;
selecting one of the plurality of subranges of data based on the selection probability;
dividing the selected subrange into additional subranges;
recursively iterating the computing, the selecting, dividing, and repeating for the additional subranges, until the selected subrange has a size of one, each iteration being performed on subranges of the selected subrange from an immediately previous iteration; and
returning a result via the network to the request, the request including data from the selected subrange with a size of one.

9. The method of claim 8, wherein the selecting includes:
for each of the plurality of subranges:
computing a rank of the subrange for data contained in the database of the first party;
jointly securely computing the rank of the subrange for data with at least one other party in the multiparty system;
combining the rank of the subrange of data from the at least one other party and the rank of the subrange for data contained in the database of the first party in to a global rank;
determining a utility of the subrange using the global rank; and
calculating a selection probability for the subrange using a fixed value and the utility.

10. The method of claim 9, wherein the combining includes adding the ranks.

11. The method of claim 9, wherein the fixed value is ln(2).

12. The method of claim 8, wherein the selecting includes:
for each of the plurality of subranges:
computing a rank of the subrange for data contained in the database of the first party;
calculating a utility for the subrange based on the rank;
jointly securely computing weights of the subrange for data with at least one other party in the multiparty system; and
determining a selection probability for the subrange by combining the weights for the subrange.

13. The method of claim 12, wherein the combining includes multiplying the weights.

14. The method of claim 12, wherein the calculating a utility includes bringing to a power of the rank.

15. A non-transitory machine-readable medium storing instructions which, when executed by one or more processors, cause the one or more processors to perform operations comprising:
at a first party in a multiparty system having a plurality of parties with their own independent databases:
receiving a request to evaluate a function over a range of data contained in a database of the first party;
dividing the range into a plurality of subranges of data;
securely computing, for each of the plurality of subranges of data, a selection probability for the subrange, based on information received about each of the plurality of subranges of data from at least one other party in the multiparty system, the at least one other party in the multiparty system providing the information based on data not shared with the first party;
selecting one of the plurality of subranges of data based on the selection probability;
dividing the selected subrange into additional subranges;
recursively iterating the computing, the selecting, dividing, and repeating for the additional subranges, until the selected subrange has a size of one, each iteration being performed on subranges of the selected subrange from an immediately previous iteration; and
returning a result to the request, the request including data from the selected subrange with a size of one.

16. The non-transitory machine-readable medium of claim 15, wherein the selecting includes:
for each of the plurality of subranges:
computing a rank of the subrange for data contained in the database of the first party;
jointly securely computing the rank of the subrange for data with at least one other party in the multiparty system;
combining the rank of the subrange of data from the at least one other party and a rank of the subrange for data contained in the database of the first party in to a global rank;
determining a utility of the subrange using the global rank; and
calculating a selection probability for the subrange using a fixed value and the utility.

17. The non-transitory machine-readable medium of claim 16, wherein the combining includes adding the ranks.

18. The non-transitory machine-readable medium of claim 16, wherein the fixed value is ln(2).

19. The non-transitory machine-readable medium of claim 15, wherein the selecting includes:
for each of the plurality of subranges:
computing a rank of the subrange for data contained in the database of the first party;
calculating a utility for the subrange based on the rank;
jointly securely computing weights of the subrange for data with at least one other party in the multiparty system; and
determining a selection probability for the subrange by combining the weights for the subrange.

20. The non-transitory machine-readable medium of claim 19, wherein the combining includes multiplying the weights.

* * * * *